United States Patent
Umemoto et al.

(10) Patent No.: US 8,647,160 B2
(45) Date of Patent: Feb. 11, 2014

(54) CONNECTION TERMINAL, TERMINAL CONNECTION STRUCTURE, AND TERMINAL BOX

(75) Inventors: Masayuki Umemoto, Osaka (JP); Keiichi Kimura, Osaka (JP)

(73) Assignee: Yukita Electric Wire Co., Ltd., Osaka (JP)

( * ) Notice: Subject to any disclaimer, the term of this patent is extended or adjusted under 35 U.S.C. 154(b) by 83 days.

(21) Appl. No.: 13/321,463

(22) PCT Filed: May 20, 2010

(86) PCT No.: PCT/JP2010/058533
§ 371 (c)(1),
(2), (4) Date: Dec. 30, 2011

(87) PCT Pub. No.: WO2010/134572
PCT Pub. Date: Nov. 25, 2010

(65) Prior Publication Data
US 2012/0100731 A1   Apr. 26, 2012

(30) Foreign Application Priority Data

May 20, 2009  (JP) ................................. 2009-122293

(51) Int. Cl.
*H01R 13/187*   (2006.01)
(52) U.S. Cl.
USPC ........................................................ 439/845
(58) Field of Classification Search
USPC .................................. 439/845, 850–854, 842
See application file for complete search history.

(56) References Cited

U.S. PATENT DOCUMENTS

| | | | | |
|---|---|---|---|---|
| 4,934,966 A | * | 6/1990 | D'Urso | 439/849 |
| 6,042,433 A | * | 3/2000 | Chen | 439/852 |
| 6,102,752 A | * | 8/2000 | Bommel et al. | 439/845 |

(Continued)

FOREIGN PATENT DOCUMENTS

| | | |
|---|---|---|
| JP | 50-48483 A | 4/1975 |
| JP | 61-4173 A | 1/1986 |

(Continued)

OTHER PUBLICATIONS

International Search Report for the Application No. PCT/JP2010/058533 mailed Jun. 15, 2010.

*Primary Examiner* — Jean F Duverne
(74) *Attorney, Agent, or Firm* — Cheng Law Group, PLLC (57) ABSTRACT

A terminal box (1) includes a connection terminal (3) that can interconnect a terminal (4) of a bus bar and a core wire (221) of an output cable (22) and that is in a box main body (11). One end of the connection terminal (3) has an insertion connecting portion (32) into which the terminal (4) of the bus bar can be inserted, and the other end has a cable press-fitting portion (39) to which the core wire (221) of the output cable (22) that is to be connected to a terminal main body (31) is press-fitted. The insertion connecting portion (32) includes an elastic contact piece (35) provided with an elastic repulsive force, and the terminal (4) of the bus bar can be forcibly introduced thereinto.

7 Claims, 5 Drawing Sheets

(56) References Cited

U.S. PATENT DOCUMENTS

| | | | |
|---|---|---|---|
| 6,171,155 B1* | 1/2001 | Miwa et al. | 439/852 |
| 6,379,199 B1* | 4/2002 | Chen | 439/852 |
| 6,527,600 B2* | 3/2003 | Alonso Merino et al. | 439/849 |
| 6,579,132 B2* | 6/2003 | Sato et al. | 439/852 |
| 6,758,701 B2* | 7/2004 | Kato | 439/852 |
| 7,303,447 B1* | 12/2007 | Tyler | 439/748 |
| 7,465,199 B2* | 12/2008 | Osada et al. | 439/845 |
| 7,553,203 B2* | 6/2009 | Anbo et al. | 439/852 |
| 7,713,100 B2* | 5/2010 | Hernandez et al. | 439/884 |
| 8,128,441 B2* | 3/2012 | Mukuno | 439/845 |

FOREIGN PATENT DOCUMENTS

| | | |
|---|---|---|
| JP | 61-42880 A | 3/1986 |
| JP | 6-60964 U | 8/1994 |
| JP | 10-127321 A | 5/1998 |
| JP | 2001-77391 A | 3/2001 |
| JP | 2006-351597 A | 12/2006 |
| JP | 2007-87621 A | 4/2007 |
| JP | 2007-115915 A | 5/2007 |
| WO | WO-2006/117895 A1 | 11/2006 |
| WO | WO-2007/013262 A1 | 2/2007 |

* cited by examiner

CONNECTION TERMINAL, TERMINAL CONNECTION STRUCTURE, AND TERMINAL BOX

TECHNICAL FIELD

The present invention relates to a connection terminal, a terminal connection structure, and a terminal box including this connection terminal.

BACKGROUND ART

Recently, solar photovoltaic systems have been provided that perform solar photovoltaic using solar cell modules that are arranged in a matrix on a roof of a building or the like. Such solar photovoltaic systems use solar cell module terminal boxes in order to electrically connect adjacent solar cell modules and extract electrical power generated by the solar cell modules.

A terminal box is attached to the rear face side of a solar cell module in which a large number of solar cells connected in series are arranged. As disclosed in, for example, PTLS 1 and 2, a terminal box is configured such that a plurality of terminal plates are arranged in a box main body and a bypass diode is disposed between adjacent terminal plates.

This sort of box main body is made of a synthetic resin material and in the shape of an open-topped box. Furthermore, an opening portion is formed on a bottom face of the box main body throughout substantially the entire width of the bottom face. The plurality of terminal plates inside the box main body are arranged such that their tip ends face the opening portion of the box main body. An output lead wire connected to each solar cell group of the solar cell module passes through this opening portion. Each output lead wire that passes through the opening portion is connected by soldering or the like to the tip end of a corresponding terminal plate.

The box main body is connected to the solar cell module in this manner, and is internally filled with an insulating resin such as silicone resin. Accordingly, components such as terminal plates and output lead wires inside the box main body are sealed. Furthermore, the box main body is hermetically sealed with a cover attached to the open top of the box main body.

CITATION LIST

Patent Literature

PTL 1: JP 2001-77391A
PTL 2: JP 2006-351597A

SUMMARY OF INVENTION

Problem to be Solved by the Invention

In this sort of conventional terminal box, it is difficult to connect a terminal plate and an output terminal of a solar cell module.

More specifically, a metal foil such as a copper foil is typically disposed on an output terminal of a solar cell module, and, in order to solder the metal foil to a terminal plate, it is necessary to fix the metal foil to a predetermined position on the terminal plate using tweezers with one hand, and, at the same time, to move a soldering iron with the other hand to connect the metal foil and the terminal plate. Thus, an operation that connects the terminal plate and the output terminal of the solar cell module is difficult and requires a considerable level of skill.

It is also possible to mechanically connect the terminal plate and the output terminal of the solar cell module by screwing or the like instead of by soldering. Here, also in this case, the connection operation requires effort and time as in the case of the soldering operation. In addition, in the case of screwing, a screw may become loose, and it is difficult to obtain a terminal box that is reliable for a long period of time.

The present invention was made in view of these conventional problems, and it is an object thereof to provide a connection terminal that can improve operability and reliability because connection with an output terminal can be easily established without using a connection method where effort and time are required such as soldering, a terminal connection structure thereof, and a solar cell module terminal box using the connection terminal.

Means for Solving the Problems

In order to solve the above-described problems, the present invention is directed to a connection terminal that can interconnect a terminal of a bus bar and an output cable and that is provided with a terminal main body. A first end of the terminal main body has an insertion connecting portion into which the terminal of the bus bar can be inserted, and a second end has a cable press-fitting portion to which a core wire of the output cable that is to be connected to the terminal main body is press-fitted. The insertion connecting portion includes a holding portion that is substantially in a shape of a quadrangular cylinder integrally formed on the first end of the terminal main body, and an elastic contact piece that is extended into the holding portion. The elastic contact piece is extended from the first end of the terminal main body, folded back toward the second end, and bent so as to be in contact with an inner face of the holding portion, and, thus, is provided with an elastic repulsive force, and a face of the elastic contact piece opposing the holding portion has a protrusion portion. The terminal of the bus bar can be forcibly introduced into between the elastic contact piece and the holding portion using the elastic repulsive force of the elastic contact piece, and the terminal of the bus bar and the output cable are connected to each other via the elastic contact piece.

Accordingly, the terminal of the bus bar can be easily and reliably connected to the first end of the terminal main body, and an operation such as soldering or screwing is no more required.

Furthermore, in the connection terminal according to the present invention, an end of the elastic contact piece that is a free end is extended outward from the holding portion to form a lever in a shape bent outward, and the elastic contact piece can be operated so as to be spaced apart from the inner face of the holding portion by pressing the lever.

Accordingly, the terminal of the bus bar can be more easily and more reliably connected to the insertion connecting portion of the terminal main body.

Furthermore, in the connection terminal according to the present invention, it is preferable that the holding portion is provided with a pair of holding pieces integrally extended from left and right side edges of the terminal main body, and is formed by respectively bending the holding pieces substantially into a shape of Us, and that end edges of the holding pieces oppose each other with space interposed therebetween to form a slit portion.

The thus configured holding portion can support the size and the shape of the terminal of the bus bar as appropriate.

Furthermore, the contact pressure and the holding strength when forcibly introducing the terminal of the bus bar into the insertion connecting portion can be adjusted as appropriate.

Furthermore, in the connection terminal according to the present invention, it is preferable that the elastic contact piece of the insertion connecting portion is bent so as to project toward the inner face of the holding portion, and has a cross-section substantially in a shape of a K. With this configuration, the terminal of the bus bar can be held and fixed in a preferable manner.

Furthermore, in the connection terminal according to the present invention, it is preferable that diode supporting pieces having groove portions for holding a bypass diode are provided upright integrally on left and right side edges of a portion between the insertion connecting portion and the cable press-fitting portion. With this configuration, the bypass diode can be easily disposed inside the box main body.

In addition, the scope of the technical idea of the present invention also includes a terminal connection structure using the connection terminal according to the above-described solving means. That is to say, the present invention is directed to a terminal connection structure in which a terminal of a bus bar is inserted into and connected to a terminal main body. An insertion connecting portion including a holding portion that is substantially in a shape of a quadrangular cylinder and an elastic contact piece that is disposed inside the holding portion is integrally formed on the terminal main body. The elastic contact piece is extended from a first end of the terminal main body, folded back toward a second end, and bent so as to be in contact with an inner face of the holding portion, and, thus, is provided with an elastic repulsive force, and a face of the elastic contact piece opposing the holding portion has a protrusion portion. The terminal of the bus bar is forcibly introduced into between the elastic contact piece and the holding portion using the elastic repulsive force of the elastic contact piece and held between the elastic contact piece and the holding portion, and the protrusion portion of the elastic contact piece is pressed against and connected to the terminal of the bus bar.

In addition, the scope of the technical idea of the present invention also includes a terminal box using the connection terminal according to the above-described solving means. That is to say, the present invention is directed to a terminal box that can be attached to a solar cell module and that can electrically connect a plurality of solar cell modules. The terminal box includes a box main body that is in a shape of an open box, and a cover that closes an opening of the box main body, and a connection terminal that can interconnect a terminal of a bus bar of the solar cell module and a core wire of an output cable for extracting output from the bus bar to the outside is disposed inside the box main body. One end of the connection terminal has an insertion connecting portion into which the terminal of the bus bar can be inserted, and another end has a cable press-fitting portion to which the core wire of the output cable that is to be connected to the terminal main body is press-fitted. The insertion connecting portion includes a holding portion that is substantially in a shape of a quadrangular cylinder integrally formed on a first end of the terminal main body, and an elastic contact piece that is extended into the holding portion. The elastic contact piece is extended from the first end of the terminal main body, folded back toward a second end, and bent so as to be in contact with an inner face of the holding portion, and, thus, is provided with an elastic repulsive force, and a face of the elastic contact piece opposing the holding portion has a protrusion portion. The terminal of the bus bar can be forcibly introduced into between the elastic contact piece and the holding portion using the elastic repulsive force of the elastic contact piece, and the terminal of the bus bar can be connected to the output cable by being introduced into the box main body via a connecting opening portion formed in the box main body and forcibly introduced into the insertion connecting portion of the connection terminal.

With such a configuration, connection can be established simply by inserting the output terminal into the connection terminal, without using a connection method where effort and time are required such as soldering or a screwing method where a screw may become loose. Thus, the operation does not require skill, and anyone can easily perform the operation.

Effects of the Invention

The thus configured present invention can provide a reliable terminal connection structure in which the connection terminal and the output terminal can be connected to each other without using a connection method where effort and time are required such as soldering or a screwing method where a screw may become loose, and, thus, the operation does not require skill, and anyone can easily perform the operation, and, furthermore, a connection terminal and a terminal box that improve the operability.

DESCRIPTION OF EMBODIMENTS

Hereinafter, an embodiment of a connection terminal, a terminal connection structure, and a terminal box according to the present invention will be described with reference to the drawings.

Figure 1:
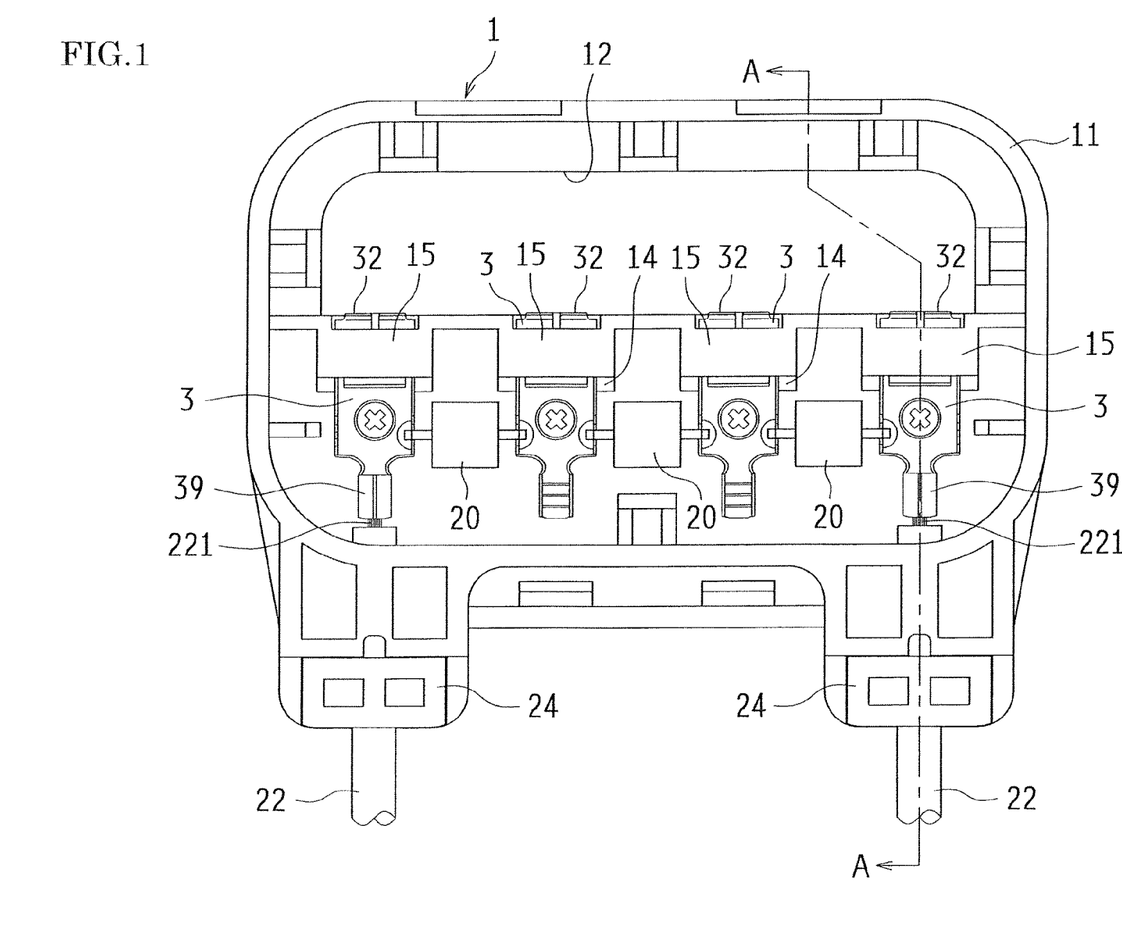
FIG. 1 is a plan view showing an internal portion of a terminal box according to an embodiment of the present invention.
Figure 2:
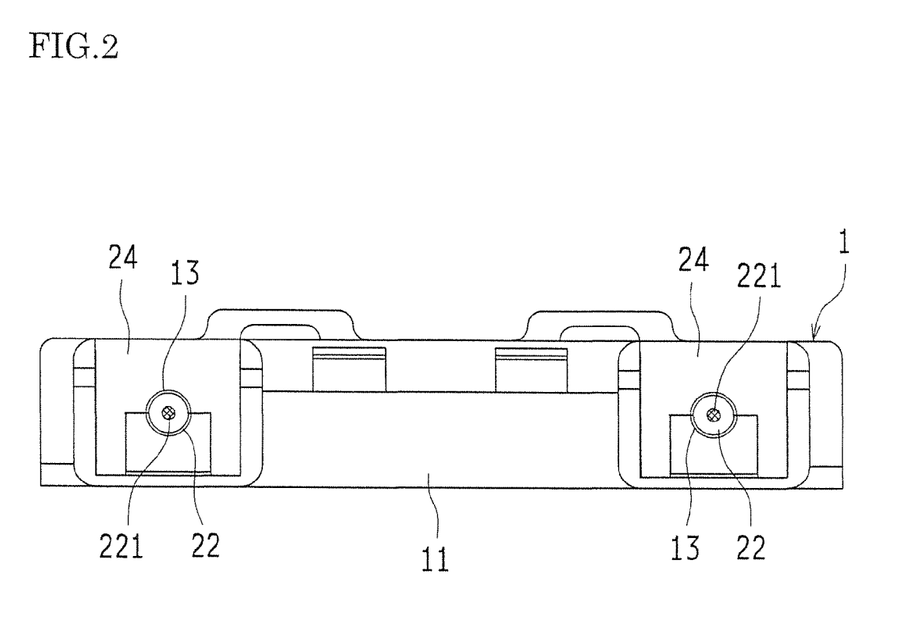
FIG. 2 is a side view of the terminal box viewed in the introduction direction of output cables that are connected to the terminal box of FIG. 1.
Figure 3:
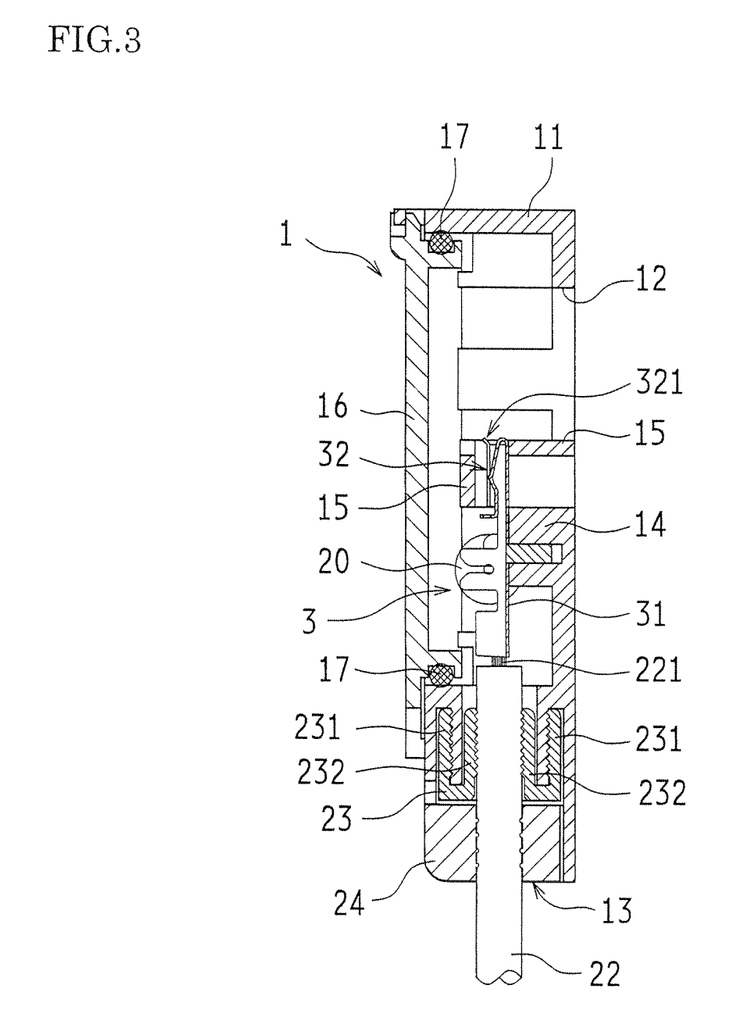
FIG. 3 is a cross-sectional view taken along A-A in FIG. 1 showing a state in which a cover has been attached to a box main body.

FIGS. 1 to 3 show a terminal box according to an embodiment of the present invention, wherein FIG. 1 is a plan view showing an internal portion of the terminal box, FIG. 2 is a side view showing, among side faces of the terminal box, a side face provided with conduction portions for output cables, and FIG. 3 is a cross-sectional view taken along A-A in FIG. 1 showing a state in which a cover 16 has been attached to a box main body 11.

Description of the Terminal Box

A terminal box 1 is attached, for example, to a solar cell module whose surface is provided with a plurality of solar cells that are electrically connected to each other. The terminal box 1 forms a solar photovoltaic system using a plurality of solar cell modules that are arranged on a roof of a building or the like. The terminal box 1 can be used to electrically connect adjacently arranged solar cell modules and extract electrical power generated by the solar cell modules.

The box main body 11 of the terminal box 1 is made of a synthetic resin material in which all of weather resistance, electrical insulation, shock resistance, thermal resistance, and flame resistance are excellent, such as modified PPO (polyphenylene oxide) or ABS (acrylonitrile-butadiene-styrene), and is substantially in the shape of a box.

As shown in FIG. 1, in the box main body 11, one face is open, and another face is provided with a connecting opening portion 12. Herein, for the sake of convenience, a description will be given assuming that the open side of the box main body 11 is the top and the side provided with the connecting opening portion 12 is the bottom.

As shown in FIG. 3, on the bottom of the box main body 11, a fixing stage 14 for fixing a connection terminal 3 is disposed upright in the inner direction. In this exemplary embodiment, the fixing stage 14 supports a terminal main body 31 of the connection terminal 3 from the bottom side of the box main body 11.

Furthermore, the box main body 11 is provided with a support portion 15 that supports a tip end of the connection terminal 3 on the bottom of the box main body 11. The support portion 15 includes a space that covers an insertion connecting portion 32 of the connection terminal 3.

The space inside the box main body 11 is filled with an insulating resin such as silicone resin after all components such as the connection terminals 3 are attached. Accordingly, all electrical connecting parts inside the box main body 11 are sealed with the resin. As shown in FIG. 3, the cover 16 is attached to close the opening at the top of the box main body 11. Here, in FIGS. 1 and 3, a state is shown in which the box main body 11 is not filled with the insulating resin for the sake of a more legible drawing.

As shown in FIG. 1, four connection terminals 3 are included inside the box main body 11. The four connection terminals 3 are arranged at predetermined intervals. The connection terminals 3 are arranged such that their ends on one side (hereinafter, referred to as the "first ends") face the connecting opening portion 12 of the box main body 11. The first ends of the connection terminals 3 are connected to terminals 4 of bus bars (see FIGS. 5(a) to 5(d) described later), which are output terminals from a solar cell module.

Furthermore, among these connection terminals 3, two connection terminals 3 arranged at both ends have ends on the other side (hereinafter, referred to as the "second ends") that are respectively connected to core wires 221 of output cables 22 for extracting output from the bus bars to the outside. As shown in FIG. 2, two cable conduction portions 13 are formed on one side wall of the box main body 11, and the output cables 22 are respectively introduced into the box main body 11. The core wires 221 of the output cables 22 are respectively connected to the second ends of the connection terminals 3.

Fixing members 24 for fixing cables are attached to the output cables 22. Each of the output cables 22 is connected to a connector or the like (not shown) for external connection outside the box main body 11, and can be coupled with an output cable or the like of a terminal box 1 attached to another solar cell module.

As shown in FIG. 3, the connection terminal 3 is disposed on the fixing stage 14 of the box main body 11, and integrally attached to the box main body 11 by screwing or the like. At that time, the insertion connecting portion 32 at the first end of the connection terminal 3 is inserted into the internal space of the support portion 15 and disposed therein.

A bypass diode 20 is disposed between two adjacent connection terminals 3 inside the box main body 11. In this exemplary embodiment, three bypass diodes 20 are used in one terminal box 1. Each bypass diode 20 is connected between two connection terminals 3 in parallel to a solar cell module. Accordingly, an opposite direction current can be prevented from flowing into the solar cell module.

Furthermore, in this exemplary embodiment, a packaged diode formed by molding a synthetic resin or the like is used as the bypass diode 20. The bypass diode 20 is connected by soldering lead wire portions of the bypass diode 20 to the connection terminals 3.

A water-stop sleeve 23 is attached to an external portion of each output cable 22. The water-stop sleeve 23 prevents water from entering the internal portion of box main body 11 from the outside, and fixes the output cable 22 to the box main body 11.

In the state shown in FIG. 3, the water-stop sleeve 23 is provided with an inner sleeve 232 that is substantially in the shape of a cylinder and an outer sleeve 231 that is disposed on the outer side of the inner sleeve 232, and these inner and outer sleeves are integrally formed. The inner sleeve 232 is in close contact with the outer circumferential face of the output cable 22, and the outer sleeve 231 is in close contact with the cable conduction portion 13. Accordingly, the watertightness between the internal portion of the box main body 11 and the outside is secured.

The fixing member 24 is attached to the output cable 22 near the water-stop sleeve 23. The fixing member 24 is a member for stably fixing the output cable 22 to the box main body 11. The fixing member 24 is made of the same material as the box main body 11, and firmly attached to the outer circumferential portion of the output cable 22 by ultrasonic welding or the like.

Furthermore, in the state shown in FIG. 3, the cover 16 is attached to close the opening of the box main body 11. A portion where the cover 16 and the box main body 11 are fitted to each other is provided with a sealing member 17 made of an O-ring, a rubber material, or the like, and, thus, the watertightness is secured.

With such a terminal box 1, the terminals 4 of the bus bars are introduced into the box main body 11 via the connecting opening portion 12 that is formed through the box main body 11, and connected to the insertion connecting portions 32 of the connection terminals 3.

Description of the Connection Terminal

Next, the connection terminal 3 disposed inside the box main body 11 of the terminal box 1 will be specifically described with reference to the drawings.

Figure 4:
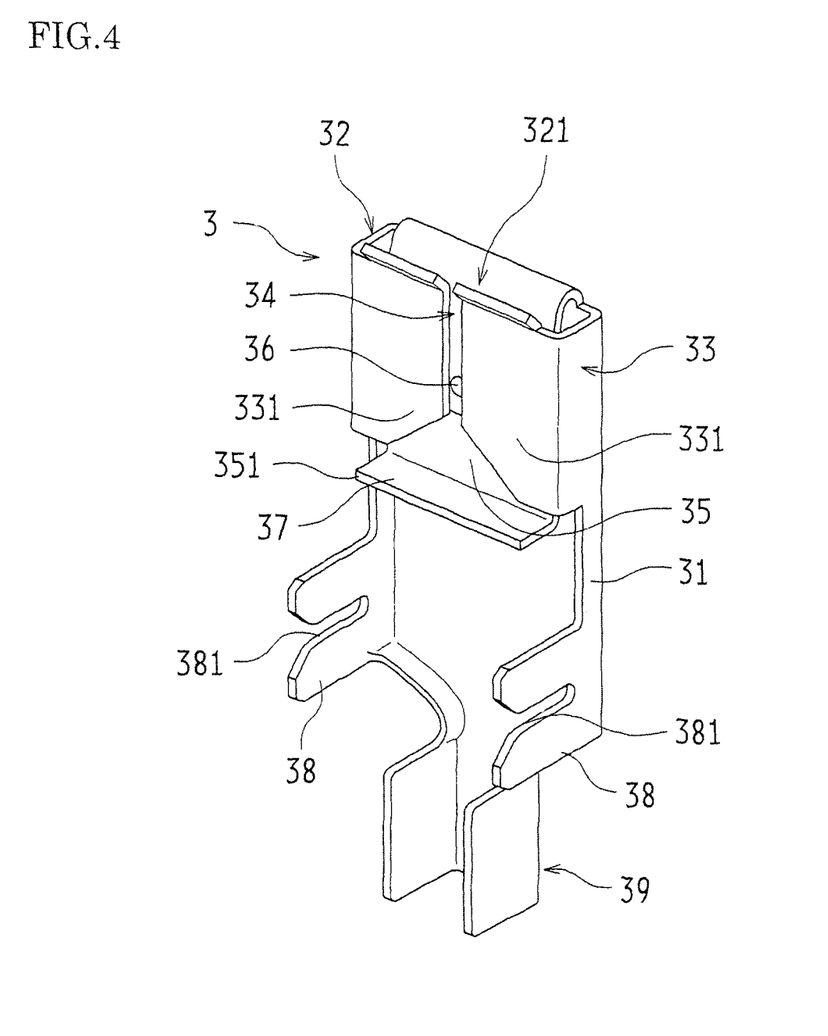
FIG. 4 is a perspective view showing a connection terminal according to the embodiment of the present invention.

FIG. 4 is a perspective view showing an example of the connection terminal 3. FIGS. 5(a) to 5(d) are explanatory views showing an operation that inserts the terminal 4 of the bus bar into the connection terminal 3 of FIG. 4 in a step-by-step manner as cross-sections.

All of the four connection terminals 3 arranged inside the above-described terminal box 1 have the same shape. Each of the connection terminals 3 is configured such that a first end (the upper portion in FIG. 4) of the terminal main body 31 has the insertion connecting portion 32 into which the terminal 4 of the bus bar can be inserted and a second end (the lower portion in FIG. 4) has a cable press-fitting portion 39 to which the core wire 221 of the output cable 22 is press-fitted.

The insertion connecting portion 32 of the connection terminal 3 is provided with a holding portion 33 and an elastic connecting piece 35. The holding portion 33 is integrally formed on the first end of the terminal main body 31, and is substantially in the shape of a quadrangular cylinder. The elastic connecting piece 35 is also integrally formed on the first end of the terminal main body 31, and is disposed inside the holding portion 33.

In the state shown in FIG. 4, the holding portion 33 is formed by bending, substantially into the shape of Us, a pair of holding pieces 331 extended from left and right side edges of the terminal main body 31. Furthermore, the holding pieces 331 bent substantially into the shape of Us are arranged such that their end edges oppose each other with slight space interposed therebetween to form a slit portion 34. In this manner, the holding portion 33 is integrally formed on the terminal main body 31 and is substantially in the shape of a quadrangular cylinder having the slit portion 34.

Here, the holding portion 33 can be deformed into various shapes using the slit portion 34, i.e., the holding pieces 331 can be bent further inward or bent into the shape of semicircles.

The elastic contact piece 35 is extended from the first end of the terminal main body 31. The elastic contact piece 35 is folded back substantially in the shape of a U from the first end to the second end of the terminal main body 31, and inserted into the holding portion 33. Accordingly, as shown in FIG. 4, the elastic contact piece 35 is disposed so as to oppose an inner face of the holding portion 33. Furthermore, the elastic contact piece 35 is bent so as to be in contact with inner faces of the holding pieces 331 of the holding portion 33.

Figure 5:
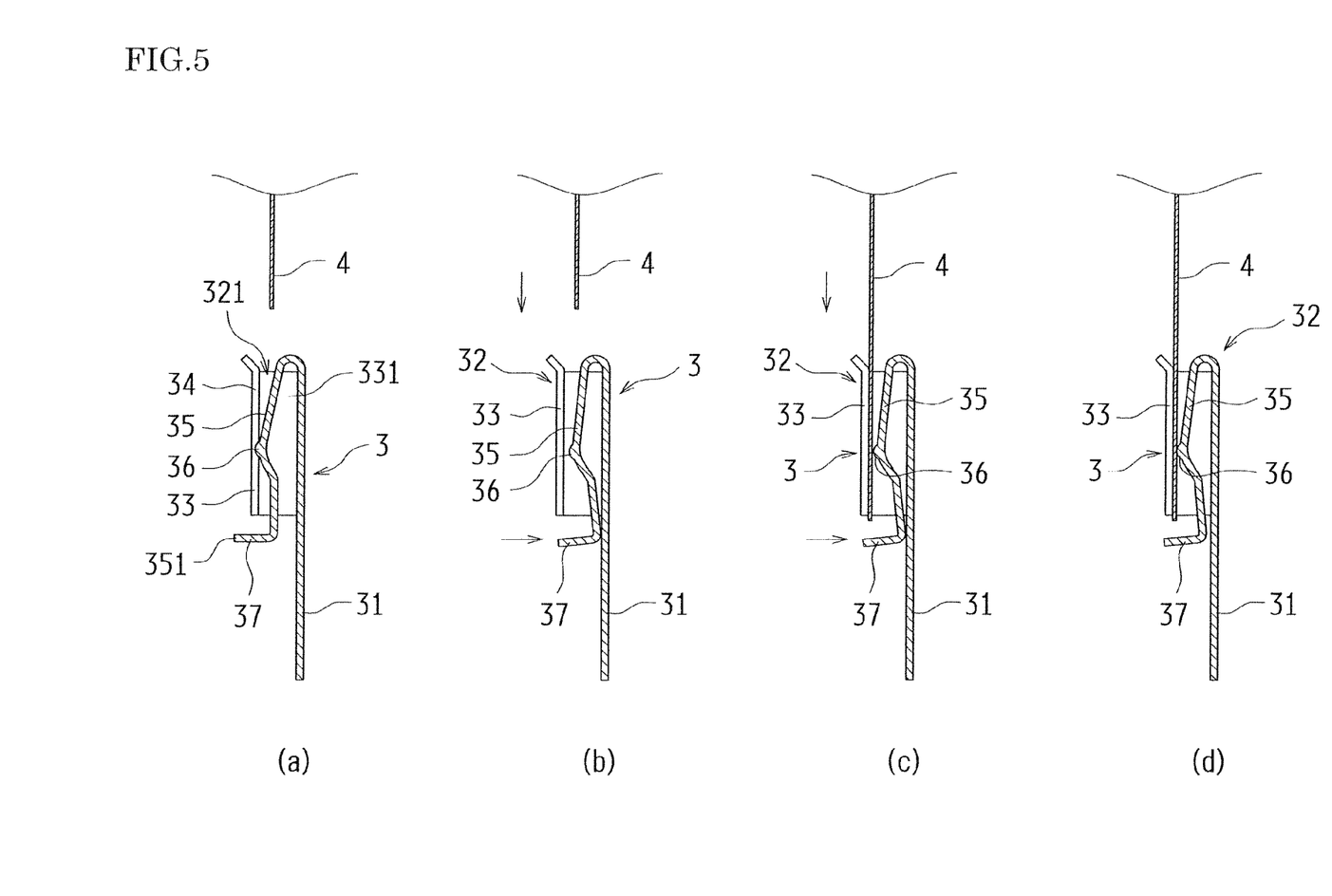
FIGS. 5(a) to 5(d) are explanatory views showing an operation that inserts a terminal of a bus bar into the connection terminal of FIG. 4 in a step-by-step manner as cross-sections of the connection terminal and the bus bar.

More specifically, the portion of the elastic contact piece 35 folded back at the first end of the terminal main body 31 is spaced apart from the inner face of the holding portion 33. Accordingly, as shown in FIGS. 4 and 5(a), a tapered insertion opening 321 is formed that is wider toward the first end of the terminal main body 31 and narrower toward the inner side of the holding portion 33.

The elastic contact piece 35 has a shape obtained by folding back the elastic contact piece 35 at the first end of the terminal main body 31 in this manner, and, thus, is provided with an elastic repulsive force that acts toward the inner face of the holding portion 33. Furthermore, in this exemplary embodiment, a face of the elastic contact piece 35 opposing the holding pieces 331 is provided with a columnar protrusion portion 36. The position and the size of the protrusion portion 36 are set such that it perfectly fits into the slit portion 34 of the holding portion 33.

Furthermore, as shown in FIG. 4, an end of the elastic contact piece 35 is a free end. A free end 351 of the elastic contact piece 35 is extended outward from the holding portion 33 and is bent outward to form a lever 37. The lever 37 can be used as an operation portion that is pressed. When the lever 37 is pressed, the elastic contact piece 35 can be spaced apart from the inner faces of the holding pieces 331. Furthermore, when the pressed lever 37 is released, the elastic contact piece 35 returns to its original shape due to its elastic repulsive force, and is again brought into contact with the inner faces of the holding pieces 331.

Furthermore, the insertion connecting portion 32 is formed such that the elastic contact piece 35 is bent so as to project toward the inner faces of the holding pieces 331 inside the holding portion 33. In the state shown in FIG. 5(a), the bent elastic contact piece 35 together with the inner faces of the holding pieces 331 has a cross-section substantially in the shape of a K.

The protrusion portion 36 of the elastic contact piece 35 is formed so as to be positioned at a top portion of the bent face. Furthermore, the elastic repulsive force of the elastic contact piece 35 can be adjusted by changing the shape of the bent portion of the holding portion 33 thereby chancing the level of the elastic contact piece 35 bent.

As described above, the terminal box 1 is provided with bypass diodes 20. The connection terminal 3 has diode supporting pieces 38 that are respectively having groove portions 381 for holding the bypass diode 20.

As shown in FIG. 4, the diode supporting pieces 38 are integrally provided upright on the left and the right side edges of the terminal main body 31 between the insertion connecting portion 32 and the cable press-fitting portion 39. The slit-like groove portions 381 are arranged at the center of the diode supporting pieces 38, and the lead wire portions of the bypass diode 20 can be inserted into and held by the groove portions 381.

The cable press-fitting portion 39 of the connection terminal 3 is disposed at the second end of the terminal main body 31. In this exemplary embodiment, the left and the right side edges of the terminal main body 31 are provided upright, and integrally formed on the terminal main body 31. The core wire 221 of the output cable 22 is put on the cable press-fitting portion 39 and connected by caulking. Furthermore, the terminal main body 31 has a narrowed portion between the cable press-fitting portion 39 and the diode supporting pieces 38, and the portion where the cable press-fitting portion 39 is formed is narrower than the portion where the insertion connecting portion 32 and the diode supporting pieces 38 are formed.

This connection terminal 3 allows the terminal 4 of the bus bar to be forcibly introduced into between the elastic contact piece 35 and the holding portion 33 due to the elastic repulsive force of the elastic contact piece 35 of the insertion connecting portion 32.

That is to say, when the lever 37 in the connection terminal 3 is pressed from the state shown in FIG. 5(a), the holding portion 33 and the elastic contact piece 35 are spaced apart from each other in the insertion connecting portion 32 as shown in FIG. 5(b). Then, as shown in FIG. 5(c), the terminal 4 of the bus bar is easily inserted into between the elastic contact piece 35 and the holding portion 33. When the terminal 4 of the bus bar has been inserted, the pressed lever 37 is released. Accordingly, as shown in FIG. 5(d), the elastic contact piece 35 returns to its original shape due to the elastic repulsive force, and the terminal 4 of the bus bar is held between the elastic contact piece 35 and the holding portion 33. Thus, the terminal 4 of the bus bar and the output cable 22 are connected to each other via the elastic contact piece 35 of the terminal main body 31.

Description of the Terminal Connection Structure

As shown in FIG. 5(d), according to the terminal connection structure according to this embodiment, in the insertion connecting portion 32 provided in the connection terminal 3, the terminal 4 of the bus bar is forcibly introduced into and connected to the first end of the terminal main body 31. In the insertion connecting portion 32, the elastic contact piece 35 and the holding portion 33 oppose each other so as to be in contact with each other, and hold the terminal 4 of the bus bar due to the elastic repulsive force of the elastic contact piece 35.

In this exemplary embodiment, the elastic contact piece 35 inside the holding portion 33 is bent so as to project toward the inner face of the holding portion 33, and presses the inserted terminal 4 of the bus bar toward the inner face of the holding portion 33.

Furthermore, the protrusion portion 36 provided on the elastic contact piece 35 is formed so as to perfectly fit into the slit portion 34 of the holding portion 33 as shown in FIG. 5(a), and disposed so as to project more outward than the inner faces of the holding pieces 331. Thus, as shown in FIG. 5(d), when the terminal 4 of the bus bar has been inserted into the insertion connecting portion 32 of the terminal main body 31, the elastic contact piece 35 is pressed down by an amount corresponding to the thickness of the terminal 4 of the bus bar and the projection height of the protrusion portion 36. As a result, the terminal 4 of the bus bar is firmly held between the elastic contact piece 35 and the holding portion 33 due to the elastic repulsive force of the elastic contact piece 35. It is possible to increase the contact pressure with the terminal 4 of the bus bar by deforming the slit portion 34 of the holding portion 33 inward by the application of pressure using the slit portion 34.

According to this terminal connection structure, the terminal 4 of the bus bar can be easily connected to the insertion connecting portion 32 of the connection terminal 3, and held with a strong elastic repulsive force. In a conventional structure, a soldering operation requires effort and time, and a screw may become loose. On the other hand, in the terminal connection structure according to this embodiment, operations required for connection can be completed not by soldering or screwing but simply by inserting the terminal 4 of the bus bar into between the elastic contact piece 35 and the holding portion 33. Thus, the connection operation of the terminal 4 of the bus bar and the connection terminal 3 does not require skill, and anyone can easily and reliably perform the operation. Furthermore, the influence of heat generated by soldering on a diode does not have to be considered, and an extremely preferable terminal connection structure can be realized.

The present invention may be embodied in various other forms without departing from the spirit or essential characteristics thereof. The embodiments disclosed in this application are to be considered in all respects as illustrative and not limiting. The scope of the present invention is indicated by the appended claims rather than by the foregoing description. All variations and modifications falling within the equivalency range of the appended claims are intended to be embraced therein.

This application claims priority based on Patent Application No. 2009-122293 filed in Japan on May 20, 2009, the entire contents of which are herein incorporated by reference.

INDUSTRIAL APPLICABILITY

The present invention can be preferably used for a solar cell module terminal box in a solar photovoltaic system, and also for a connection terminal of the terminal box and a terminal connection structure.

DESCRIPTION OF REFERENCE NUMERALS

1 Terminal box
11 Box main body
12 Connecting opening portion
13 Cable conduction portion
14 Fixing stage
15 Support portion
16 Cover
17 Sealing member
20 Bypass diode
22 Output cable
221 Core wire
23 Water-stop sleeve
231 Outer sleeve
232 Inner sleeve
24 Fixing member
3 Connection terminal
31 Terminal main body
32 Insertion connecting portion
321 Insertion opening
33 Holding portion
331 Holding piece
34 Slit portion
35 Elastic contact piece
351 Free end
36 Protrusion portion
37 Lever
38 Diode supporting piece
381 Groove portion
39 Cable press-fitting portion
4 Terminal of bus bar

The invention claimed is:

1. A connection terminal that can interconnect a terminal of a bus bar and an output cable and that is provided with a terminal main body,
wherein a first end of the terminal main body has an insertion connecting portion into which the terminal of the bus bar can be inserted, and a second end has a cable press-fitting portion to which a core wire of the output cable that is to be connected to the terminal main body is press-fitted,
the insertion connecting portion includes a holding portion that is substantially in a shape of a quadrangular cylinder integrally formed on the first end of the terminal main body, and an elastic contact piece that is extended into the holding portion,
the elastic contact piece is extended from a first side of the holding portion at the first end of the terminal main body, folded back toward the second end, and bent so as to be in contact with an inner face of a second side of the holding portion, the second side of the holding portion being opposite the first side of the holding portion, and, thus, is provided with an elastic repulsive force,
a bent portion of a face of the elastic contact piece has a protrusion portion, the face of the elastic contact piece opposing the inner face of the second side of the holding portion, and the protrusion portion is provided so as to project more outward than the inner face of the second side of the holding portion, and
the terminal of the bus bar is forcibly introduced into between the elastic contact piece and the holding portion using the elastic repulsive force of the elastic contact piece, and the terminal of the bus bar and the output cable are electrically connected to each other via the elastic contact piece.

2. The connection terminal according to claim 1, wherein an end of the elastic contact piece that is a free end is extended outward from the holding portion to form a lever in a shape bent outward, and the elastic contact piece can be operated so as to be spaced apart from the inner face of the holding portion by pressing the lever.

3. The connection terminal according to claim 1,
wherein the holding portion is provided with a pair of holding pieces integrally extended from left and right side edges of the terminal main body, and is formed by respectively bending the holding pieces substantially into a shape of Us, and
end edges of the holding pieces oppose each other with space interposed therebetween to form a slit portion.

4. The connection terminal according to any one of claims 1 to 3, wherein the elastic contact piece of the insertion connecting portion is bent so as to project toward the inner face of the holding portion, and has a cross-section substantially in a shape of a K.

5. The connection terminal according to any one of claims 1 to 3, wherein diode supporting pieces having groove portions for holding a bypass diode are provided upright integrally on left and right side edges of a portion between the insertion connecting portion and the cable press-fitting portion.

6. A terminal connection structure in which a terminal of a bus bar is inserted into and connected to a terminal main body,
wherein an insertion connecting portion including a holding portion that is substantially in a shape of a quadrangular cylinder and an elastic contact piece that is disposed inside the holding portion is integrally formed on the terminal main body,
the elastic contact piece is extended from a first side of the holding portion at a first end of the terminal main body, folded back toward a second end, and bent so as to be in contact with an inner face of a second side of the holding portion, the second side of the holding portion being opposite the first side of the holding portion, and, thus, is provided with an elastic repulsive force,
a bent portion of a face of the elastic contact piece has a protrusion portion, the face of the elastic contact piece opposing the inner face of the second side of the holding portion, and the protrusion portion is provided so as to project more outward than the inner face of the second side of the holding portion, and
the terminal of the bus bar is forcibly introduced into between the elastic contact piece and the holding portion using the elastic repulsive force of the elastic contact piece and held between the elastic contact piece and the holding portion, and the protrusion portion of the elastic contact piece is pressed against and electrically connected to the terminal of the bus bar.

7. A terminal box that can be attached to a solar cell module and that can electrically connect a plurality of solar cell modules, comprising:
a box main body that is in a shape of an open box; and
a cover that closes an opening of the box main body;
wherein a connection terminal that can interconnect a terminal of a bus bar of the solar cell module and a core wire of an output cable for extracting output from the bus bar to the outside is disposed inside the box main body;
one end of the connection terminal has an insertion connecting portion into which the terminal of the bus bar can be inserted, and another end has a cable press-fitting portion to which the core wire of the output cable that is to be connected to the terminal main body is press-fitted,
the insertion connecting portion includes a holding portion that is substantially in a shape of a quadrangular cylinder integrally formed on a first end of the terminal main body, and an elastic contact piece that is extended into the holding portion,
the elastic contact piece is extended from a first side of the holding portion at the first end of the terminal main body, folded back toward a second end, and bent so as to be in contact with an inner face of a second side of the holding portion, the second side of the holding portion being opposite the first side of the holding portion, and, thus, is provided with an elastic repulsive force,
a bent portion of a face of the elastic contact piece has a protrusion portion, the face of the elastic contact piece opposing the inner face of the second side of the holding portion, and the protrusion portion is provided so as to project more outward than the inner face of the second side of the holding portion,
the terminal of the bus bar is forcibly introduced into between the elastic contact piece and the holding portion using the elastic repulsive force of the elastic contact piece, and
the terminal of the bus bar is electrically connected to the output cable by being introduced into the box main body via a connecting opening portion formed in the box main body and forcibly introduced into the insertion connecting portion of the connection terminal.

* * * * *